US011302490B2

(12) United States Patent
Risovanyy et al.

(10) Patent No.: US 11,302,490 B2
(45) Date of Patent: Apr. 12, 2022

(54) SUPERCAPACITOR AND METHOD OF ITS CONSTRUCTION

(71) Applicants: JOINT STOCK COMPANY "SCIENCE AND INNOVATIONS", Moscow (RU); JOINT STOCK COMPANY "INSTITUTE OF NUCLEAR MATERIALS", Sverdlovsk region (RU)

(72) Inventors: Vladimir Dmitrievich Risovanyy, Moscow (RU); Sergey Viktorovich Bulyarskiy, Ulyanovsk (RU); Dmitriy Vladimirovich Markov, Sverdlovsk region (RU); Leonid Prokop'evich Sinel'nikov, Sverdlovsk region (RU); Viktor Nikolaevich Nikolkin, Sverdlovsk region (RU); Sergey Borisovich Zlokazov, Sverdlovsk region (RU); Aleksandr Aleksandrovich Dzhanelidze, Sverdlovsk region (RU); Vyacheslav Viktorovich Svetukhin, Ul'yanovsk (RU)

(73) Assignees: JOINT STOCK COMPANY "SCIENCE AND INNOVATIONS", Moscow (RU); JOINT STOCK COMPANY "INSTITUTE OF NUCLEAR MATERIALS", Sverdlovsk Region (RU)

( * ) Notice: Subject to any disclaimer, the term of this patent is extended or adjusted under 35 U.S.C. 154(b) by 142 days.

(21) Appl. No.: 15/741,095

(22) PCT Filed: Aug. 31, 2016

(86) PCT No.: PCT/RU2016/000593
§ 371 (c)(1),
(2) Date: Dec. 29, 2017

(87) PCT Pub. No.: WO2018/044192
PCT Pub. Date: Mar. 8, 2018

(65) Prior Publication Data
US 2020/0035421 A1    Jan. 30, 2020

(51) Int. Cl.
*H01G 11/36* (2013.01)
*H01G 11/30* (2013.01)
(Continued)

(52) U.S. Cl.
CPC .............. *H01G 11/36* (2013.01); *H01G 11/30* (2013.01); *H01G 11/52* (2013.01); *H01G 11/62* (2013.01);
(Continued)

(58) Field of Classification Search
CPC ........ H01G 11/36; H01G 11/78; H01G 11/52; H01G 11/74; H01G 11/62; H01G 11/86; H01G 11/30
(Continued)

(56) References Cited

U.S. PATENT DOCUMENTS

2009/0252887 A1   10/2009   Barker et al.
2014/0313636 A1   10/2014   Tour et al.

FOREIGN PATENT DOCUMENTS

WO    2012/099497 A1    7/2012
WO    2016/025532 A1    2/2016

OTHER PUBLICATIONS

PCT International Search Report dated May 15, 2017 for Application No. PCT/RU2016/000593 (2 pages).
(Continued)

*Primary Examiner* — Arun Ramaswamy
(74) *Attorney, Agent, or Firm* — Brandon V. Zuniga; James R. Gourley; Carstens & Cahoon, LLP (57) ABSTRACT

A supercapacitor consisting of a tight protective housing, first and second electrodes, which are electrically insulated
(Continued)

from each other. One or both electrodes are also insulated from the housing. Free volume of the cell and the space between the electrodes are filled with electrolyte fluid. On the surface of the first electrode there are applied carbonaceous materials comprising C-14 isotope. Method of supercapacitor construction lies in the preparation of the first and second electrodes with application of the surface layer made of carbonaceous materials, allocation of the first and second electrodes inside the tight housing and their electric insulation from each other, filling of the housing with electrolyte fluid. Into the layer of carbonaceous materials onto the surface of the first electrode the C-14 isotope is introduced.

7 Claims, 11 Drawing Sheets

(51) Int. Cl.
| | |
|---|---|
| H01G 11/52 | (2013.01) |
| H01G 11/62 | (2013.01) |
| H01G 11/74 | (2013.01) |
| H01G 11/78 | (2013.01) |
| H01G 11/86 | (2013.01) |

(52) U.S. Cl.
CPC ............ *H01G 11/74* (2013.01); *H01G 11/78* (2013.01); *H01G 11/86* (2013.01)

(58) Field of Classification Search
USPC ................. 361/502, 503, 508, 516; 29/25.02
See application file for complete search history.

(56) References Cited

OTHER PUBLICATIONS

A.N.Saurov et al. Nanostrukturirovannye istochniki toka, 1-10; vozbuzhdaemye b-izlucheniem, na osnove uglerodnykh nanotrubok. Industria Nanosistem. Izvestia vuzov.; ELEKTRONIKA, tom 20 M05 2015, p. 474-480.
D.V. Pankratov i dr. Gibkii tonkii superkondensator na osnove kompozita iz mnogostennykh uglerodnykh nanotrubok i elektroprovodiashchego polianilinao Elektronnyi nauchnyi zhurnal Sovremennye problemy nauki i obrazovania 2012 N°4 [on-line] [retrieved on May 23, 2017]. Found in Internet: <https://wwwoscience-educationora/ra/article/view?id=6660>, po 1-10.

SUPERCAPACITOR AND METHOD OF ITS CONSTRUCTION

CROSS-REFERENCE TO RELATED APPLICATIONS

This application is a US 371 Application from PCT/RU2016/000593 filed Aug. 31, 2016, the technical disclosures of which are hereby incorporated herein by reference.

BACKGROUND

Field of the Invention

The invention relates to the electrical engineering, it is designed for energy accumulation and storage and may be used for generation, accumulation and long-term storage of electrical energy, particularly, as a power supply for microelectronics and autonomous electronic devices.

RELATED ART

There is known a device (accumulator) for electricity accumulation, which operates using the principle of a secondary electric power source, where the electric energy is converted into the chemical one (when charging) and vice versa (when discharging), when the chemical energy is converted into the electrical one. The lead type accumulator is most common. Such an accumulator consists of a housing, inside of which the positive electrodes made of lead dioxide and the negative electrodes made of spongy lead, are placed. The space between the electrodes is filled with the electrolyte of sulfuric acid water solution. In the process of discharging, the active mass of both, positive and negative electrodes, reacts to form lead sulfate. In the process of accumulator operation, the chemical process called as double sulphatization takes place [D. A. Khrustalev. Accumulators.—M.: Izumrud, 2003], [V. P. Kashtanov, V. V. Titov, A. F. Uskov and others. Lead Starter Storage Batteries. Guidance.—M.: Voenizdat, 1983.—148 pp.]. Charging ceases, when the electrolyte density reaches the maximum density. For the water solution of sulfuric acid it makes 1.28 g/cm$^3$. At the end of discharge, the density drops to 1.08-1.10 g/cm$^3$, and after that another charging is required.

These devices are the most common electric energy accumulators thanks to their simplicity, manufacturability and relatively low cost. The devices have high energy density and facilitate repeated charge and discharge of the battery.

This device disadvantages are as follows: an external electricity source is needed for charging; long charging time; limited power; limited number of charge-discharge cycles. As a rule, such device life time does not exceed 10 years.

A device for electricity accumulation named as a capacitor is known [J. C. Maxwell. A Treatise on Electricity and Magnetism.—Dover, 1873.—P. 266 ff.—ISBN 0-486-60637-6.], [B. M. Yavorsky, A. A. Detlaf. Handbook on Physics for Engineers and Students of Higher Education Institutes.—M. Nauka, 1968].

An elementary capacitor consists of two metal sheets divided by a layer of dielectric, a material, which does not conduct electric current. If to connect the capacitor's sheets to the electric energy source, a charge current will run, and the positive and negative charges will be accumulated on the metal sheets. As soon as the capacitor will be charged, the current in the circuit will drop to zero. If to disconnect the capacitor from the energy source, the accumulated charge will be stored. When connecting the capacitor to a resistor, the capacitor's discharge current will run up to complete discharge. This charge-discharge cycle can be repeated many times.

The advantages of the capacitors as the electrical charge accumulators are as follows: simplicity in construction; relatively short charging time; higher capacity and higher number of charge-discharge cycles before failing if to compare with accumulators.

The disadvantage of the device is in the necessity of an external electricity source for capacitor charging.

The devices for electrical charge storage named as supercapacitors or ionistors are known [B. E. Conway. Electrochemical Supercapacitors. Scientific Fundamentals and Technological Applications. N. Y.: Kluwer Academic Plenum Publ., 1999.], [Appl. Phys. Lett., 2000, 77, p. 2421], [D. V. Pankratov and others. Flexible thin supercapacitor based on the composite from multi-walled carbon nanotubes and electroconductive polyaniline//The Modern Problems in Science and Education. 2012.—No. 4.], [http://pubs.acs.org/doi/abs/10.1021/nl8038579].

The base structure supercapacitor has two electrodes of sheet type from conductive material, between which an organic or inorganic electrolyte is placed. To improve the supercapacitor electrical parameters, the sheets are additionally coated with a porous material (activated carbon, mostly). The supercapacitor combines operation principle of two devices—capacitor and accumulator.

In supercapacitor, energy accumulation is performed by two mechanisms:

due to a capacity of a double electrical layer, which is formed at the boundary electrode-electrolyte. In this case, the capacity is determined as $$C = \frac{\varepsilon \varepsilon_0 A}{d} \quad (1)$$

where $\varepsilon$—specific conductivity of the double layer medium, $\varepsilon_0$—conductivity of vacuum, A—specific area of the electrode, d—efficient thickness of the double electrical layer.

a. due to a pseudo-capacity provided by the reversible chemical processes between the electrode and the electrolyte. In that case, accumulation of the electrons is of the Faraday character, when the electrons are produced in result of oxidation reaction and transferred through the electrode-electrolyte interface. Theoretically, the pseudo-capacity may be calculated by the formula:

$$C = \frac{n \times F}{M \times V} \quad (2)$$

where n—number of electrons migrated in result of oxidation reaction, A—Faraday constant, M—molecular mass of metal oxide, V—window of operation voltages.

Such hydrate capacitors allow to achieve higher capacity densities and power retaining high stability of characteristics when cycling.

CNT (carbon nanotubes) are peculiar for both, capacity of double electric layer, and pseudo-capacity. Depending on the CNT properties and the method of production and configuration of the electrode, the supercapacitor specific capacity may achieve 350 F/g [Chongfu Zhou.//Carbon Nanotube Based Electrochemical Supercapacitors—2006, School of Polymer, Textile and Fiber Engineering, Georgia Institute of Technology.—P—18]. In order to improve the capacity characteristics of supercapacitors, the so called CNT functionalizing is performed, which anticipates special treatment with implanting of the atoms, radicals and functional groups into the CNT structure. For example, the CNT functionalizing with a COOH group brings to the increase of the specific capacity of a capacitor from 0.25 to 91.25 F/g [Christopher M. Anton, Matthew H. Ervin//Carbon Nanotube Based Flexible Supercapacitors—Army Research Laboratory, 2011.—P 7]. The highest currently achieved value of specific capacity of the CNT based supercapacitors makes 396 F/g [http://scsiexplorer.com.ua/index.php/osnovnie-ponyatiya/1201-superkondensator.html], however, in the result of technology progress, this characteristic increases constantly, and there is the information that the value has reached 500 F/g [http://rusnanonet.ru/news/37452/].

Currently, the electrodes of most of the commercial supercapacitors are manufactured from different modifications of carbon (graphite, activated carbon, carbon nanotubes, graphene, composite carbon materials, etc.), which are the commercially available and inexpensive materials and have perfect anticorrosive properties. Wherein CNTs have higher electronic conductivity in comparison with the activated carbon. The carbon base supercapacitors are peculiar for cyclic stability and long lifetime, since neither on the surface, nor in the material volume of electrode any chemical reactions take place, and the charge accumulation is provided due to a double electric layer.

CNT supercapacitor advantages are as follows:
a) higher specific capacity as compared with capacitors; higher specific power than that of accumulator.
b) higher lifetime, i.e. resistance to number of charge-discharge cycles; it can withstand up to $10^6$ cycles practically with no capacity reduction.

The main disadvantage of supercapacitor, similarly to accumulator, is in the necessity in external electricity supply for charging.

The radioisotope source of electrical energy (Beta Cell) created in 1913 by British physicist Henry Moseley is known. It was a glass retort rearranged inside, in the center of which a radium salt on an insulated electrode was placed. The electrons of beta-decay created a potential difference between the silver layer of a glass sphere and an electrode with a radium salt. The Moseley cells were charged up to high voltage limited by the gas break-down voltage, which could be increased by the retort evacuation.

The device is known [Patent RU 2113739 C1] for electric energy production from the intra-atomic energy due to radioactive alpha- or beta-decay, comprising two closed cooled with water or air metal shells (emitter and collector) located one inside the other with a gap in vacuum $10^{-5}$-$10^{-6}$ mm Hg, wherein the radioactive material has been applied on the emitter in the form of a metal layer of 25-100 μm thick facing the gap and the collector. In the gap between the emitter and the collector, a control metal grid is placed, which is electrically connected with the secondary winding of a high-voltage transformer fed from the 50 Hz AC field network, and the emitter and the collector are electrically connected with the primary high-voltage winding of a second transformer, the secondary winding of which is connected to a power consumer. The device operates like a constantly boosted capacitor, the charging rate of which is determined by a particles flow from the emitter to the collector.

The described device has the following disadvantages: necessity in maintaining vacuum in the gap between emitter and collector; necessity in an external power supply to modulate the voltage on the grid with an amplitude sufficient for complete braking of the radioactive decay particles.

Prototype Characteristics

The supercapacitor (SC) structure is known, wherein the electrodes, which perform the functions of the sheets in the elementary capacitor, are made of carbon nanotubes (CNTs) [Yu. M. Wolfkovich and others. Carbon Nanotube Based Power Electrochemical Supercapacitors.//Electrochemical Power Engineering. 2008, Vol. 8, No. 2.—pp. 106-110]. The operating electrode of the prototype is made using the method of uniform application of the powder form nanotubes synthesized by the electric arc method on a substrate of non-porous graphite. The sulfuric acid of 35% weight concentration (1.26 g/cm$^3$ density) was used in the capacity of electrolyte. In order to improve the CNT characteristics, hydrophilization was performed by holding in the electrolyte with polarization at the potential of 1.1 V. The prototype is peculiar for a wide band of operating potentials (above 1.4 V), the specific power about 20 kW/kg and the specific energy ~1 Wh/kg.

The main disadvantage of the prototype, similarly to the previously described analogs, is in the need for an external electricity supply for supercapacitor charging.

Technical Object to be Solved by the Invention

The technical object which the invention anticipates is creation of a device for electrical charge accumulation, which does not require charging from an external electricity supply.

The other technical object is to increase the duration of the device operation without use of an external charging power supply.

SUMMARY

Summary of Selected Embodiments of the Invention

In the claimed device, the stated technical object is solved due to construction of one of the capacitor's electrodes with the carbon nanotubes (CNTs), comprising radioisotopes with beta-radiation. Wherein the CNTs are made of the C-14 radioisotope or a mixture of the C-14 radioactive isotopes with the stable isotopes of carbon. Incorporation of the carbon-14 into the CNT can be performed using three methods:
c) at the CNT synthesis stage directly by use of the liquid, hard or gaseous carbonaceous materials, which contain C-14 (for example, volatile organic compounds, methane, CO, $CO_2$ and others), as a raw material;
d) by means of impregnation of the produced from the natural stable carbon CNT with the solutions or volatile gaseous compounds, comprising the C-14 isotope;
e) by performing the CNT functionalizing using electrochemical, thermal, electrospark, laser, magnetic, ion-beam or other treatment for implanting the atoms, radicals, functional groups, comprising the C-14 isotope, into the CNT.

The other beta-decay radioisotopes may be applied on the CNT surface, for example the radionuclides H-3, Ni-63, Sr-90, Kr-85, Am-241, Ac-227, Th-229, and that substantially facilitates exiting of the electrons and charging of the supercapacitor.

In that case, we incarnate a self-charging supercapacitor, wherein charging is arranged not using an external electricity source, but by means of transformation of the energy of the beta-source electrons while decay.

BRIEF DESCRIPTION OF THE DRAWINGS

FIG. 2b depicts an exterior of the studied cell of FIG. 2a.

DETAILED DESCRIPTION

Figure 1:
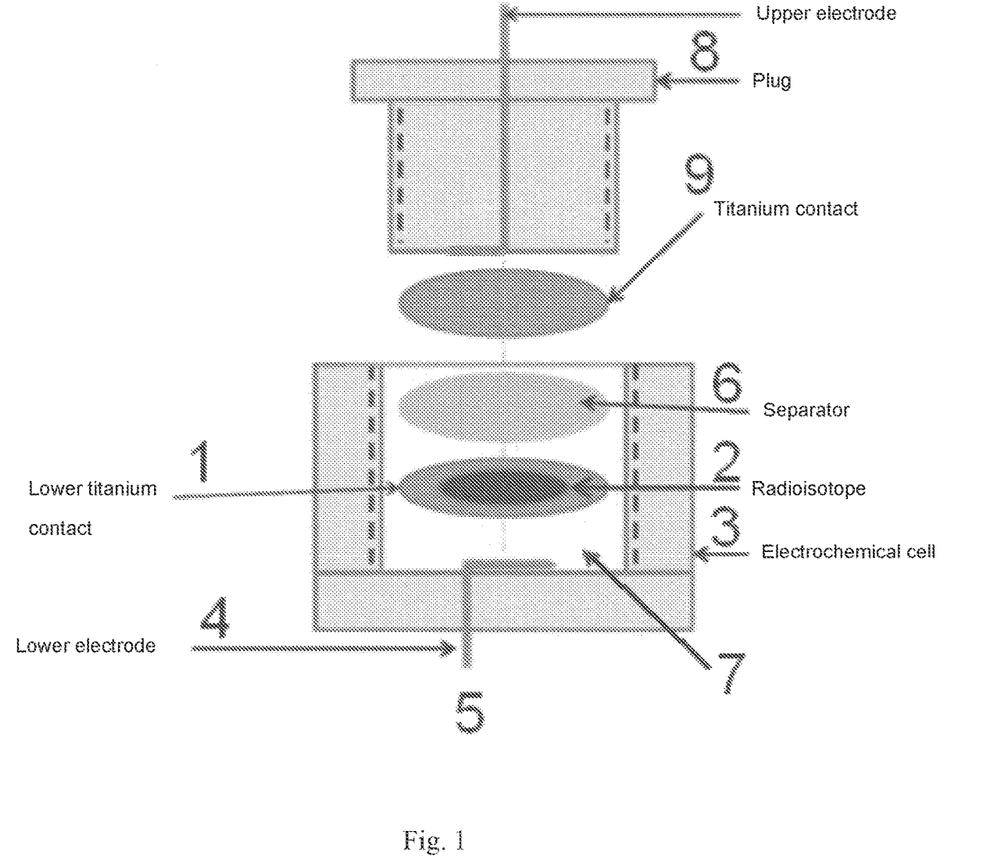
FIG. 1 is a schematic illustration depicting an example of the structure of a self-charging supercapacitor.

In FIG. 1, a structure of a self-charging supercapacitor is presented. It consists of a metal substrate (i.1), on which an array of carbon nanotubes (CNTs) has been grown, which incorporate the C-14 radioactive isotope (i.2). The substrate is placed into a fluoroplastic housing (i.3), where it stays in contact with the lower electrode (i.4) with the external led (i.5). The separator (i.6), which prevents mechanical contact of the opposite electrodes and obstacles mixing of the cathodic and the anodic electrolytes, is placed above the active substrate. The cell housing is filled with the electrolyte (i.7) and closed with the plastic cover (i.8). The second electrode (i.9) is inserted into the cover. The cover (i.8) seals the cell.

Figure 2A:
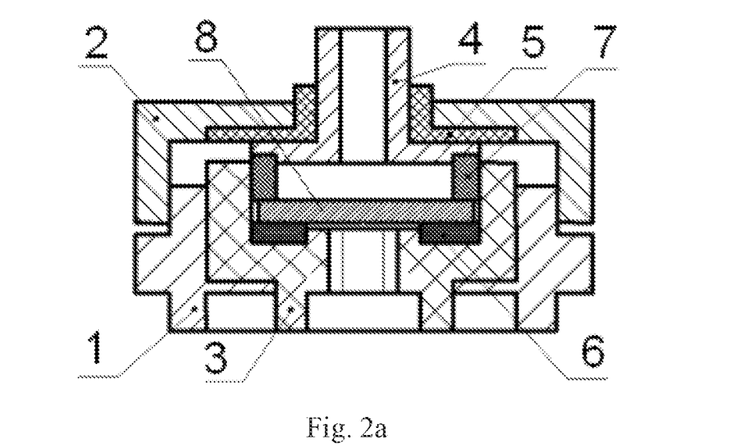
FIG. 2a is a schematic illustration depicting the structure of a studied cell.
Figure 2B:
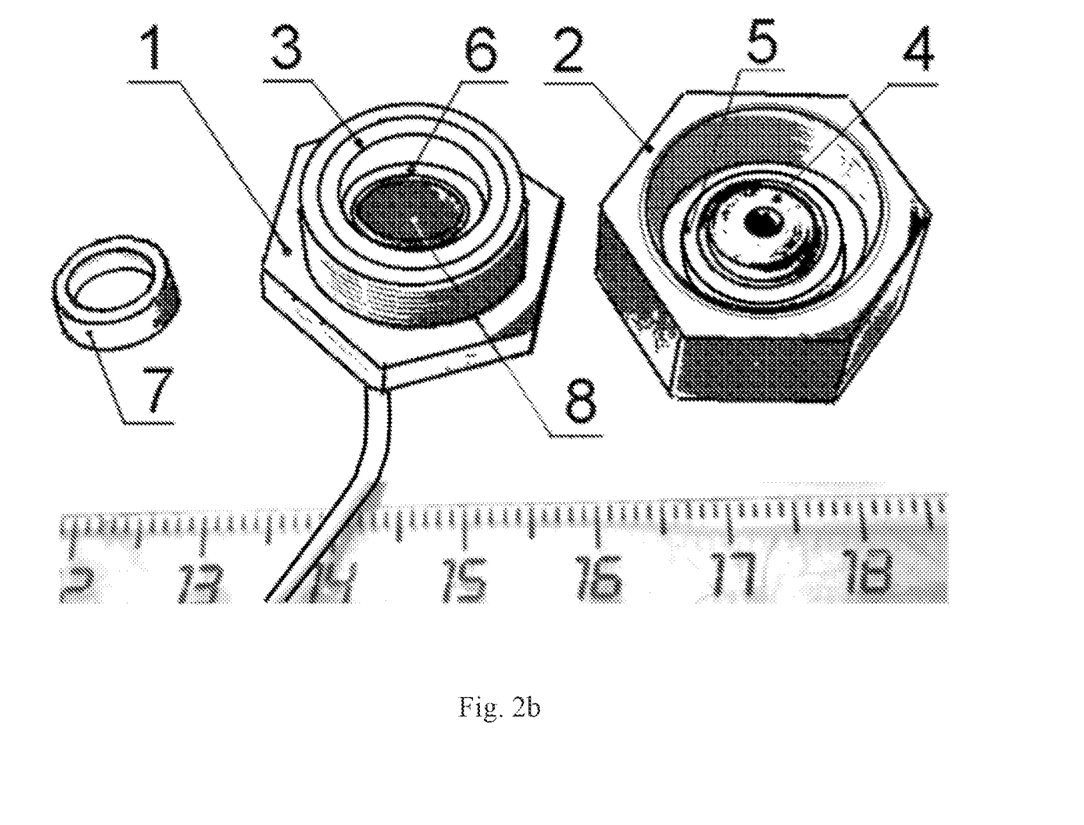

In FIG. 2(a, b), the structure and the exterior of the mock-ups of the studied supercapacitor cells are presented. The cell consists of housing 1 and cover 2 made of stainless steel, inside of which fluoroplastic housing 3 and electrode-collector 4 isolated from the cover with fluoroplastic washer 5 are located. The operating electrode under study 8 in the form of a substrate is placed with the coating facing up on rubber ring 6 and pressed to it with fluoroplastic insert 7. The electric wire with a terminal is lead from the substrate's lower side using a spring contact with a screw. The cell is filled with an electrolyte through hole 4 in the electrode.

Under the given dimensions, the visible part of the substrate makes 0.5 $cm^2$, and the dry cell's electrical capacity makes 82 pF.

Preparation of the substrates with CNT was performed by means of multiple serial applying of the alcoholic solution of aniline hydrochloride, which contains C-14 isotope, on the nanotubes. The applied isotope's activity was determined by means of the estimations based on the measurements of the substrate weight before and after impregnation with the reagent using the specific activity characteristics measured by the calorimetric method. The activity of the carbon-14 isotope determined by this method was equal to 1.74 and 6 mCi for two different similar type substrates. Additionally β-flow from the substrate equal to $0.8 \times 10^5$ and $2.25 \times 10^5$ $min^{-1}$ $cm^{-2}$ was measured.

The study of the electrical performance of the supercapacitor cells has been conducted using the digital Nano voltmeter III-31 (measurements at the dry and filled with electrolyte cells) and a specially prepared automated measuring system based on the analog-digital modules ADAM 4017+, which facilitates the long-term measurements in the automatic mode (the cells filled with electrolyte).

Embodiment of the invention is illustrated by the following examples.

Example 1

Figure 3:
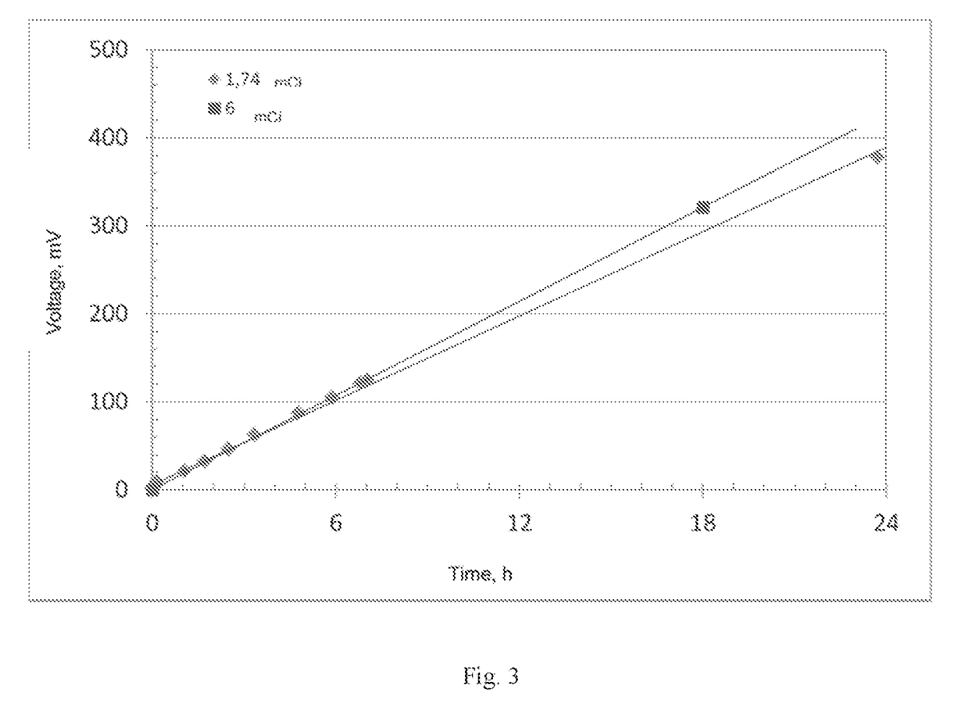
FIG. 3 is a graph depicting dynamics of charging of an illustrative cell with aniline hydrochloride with the C-14 activity equal to 1.74 and 6.0 mCi.

The substrates with the preliminarily formed one-side coatings in the form of a CNT array of ~10 μm thick were impregnated with the solution of aniline hydrochloride, wherein about a half of the carbon atoms were those of the C-14 isotope. The total activity of the C-14 as determined by the increase of the substrates' masses after drying was equal to 1.74 and 6.0 mCi for the first and the second substrates, respectively. The substrates were placed into the cells with the described above structure; the cell voltage was registered as a charge due to the C-14 isotope beta-decay. The kinetics of charging of the dry cells is presented in FIG. 3.

Charging of the cells proceeds with the negatively charged electrons emission, in result of which the substrate with the CNT acquires a positive charge. After charging the cells during a full day and reaching the voltage of about 400 mV, the cells were discharged at the load resistor while registering the voltage at it. The cell discharge at the 10 kOhm resistor continued for several fractions of a second, and at the resistor of 47 MOhm—for several minutes. The charge dynamics in the latter case is presented by the diagram in FIG. 4.

Figure 4:
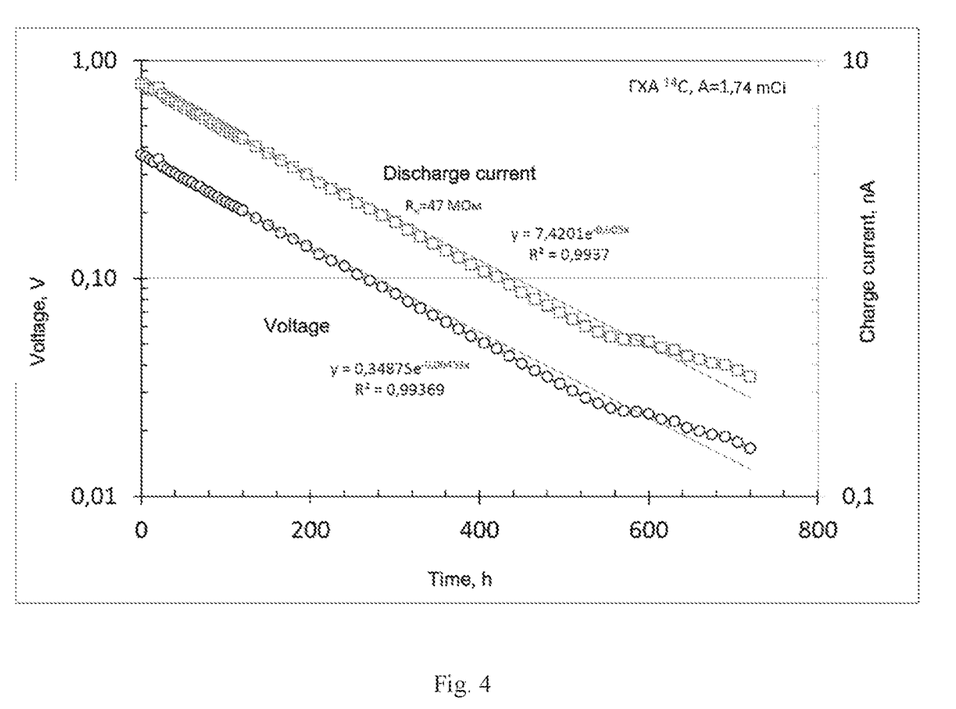
FIG. 4 is a graph depicting dynamics of discharging of the cell with aniline hydrochloride with the C-14 activity equal to 1.74 mCi.

At the initial period of the cell discharge, which lasts for 10 minutes, the discharge curve has an exponential character. Then, a serious deviation from the exponent follows, and in the stationary mode, the discharge curve stabilizes at a constant level, which is determined by equality of the speeds of cell discharging and charging, and the letter one is determined by activity of the beta-source on the substrate.

The described experiments demonstrate a low efficiency of the dry cell under direct charging by the beta-decay electrons, since only a part of the electrons participates in the cell charging process reaching the electrode-collector. Additionally, a part of the beta-decay electrons compensates the substrate's positive charge being absorbed in the CNT array on the substrate.

Example 2

The cell with a substrate of the C-14 activity equal to 1.74 mCi after the experiments with the dry cell charging and discharging was filled with distilled water. The characteristics of the cell charging and discharging were measured.

Figure 5A:
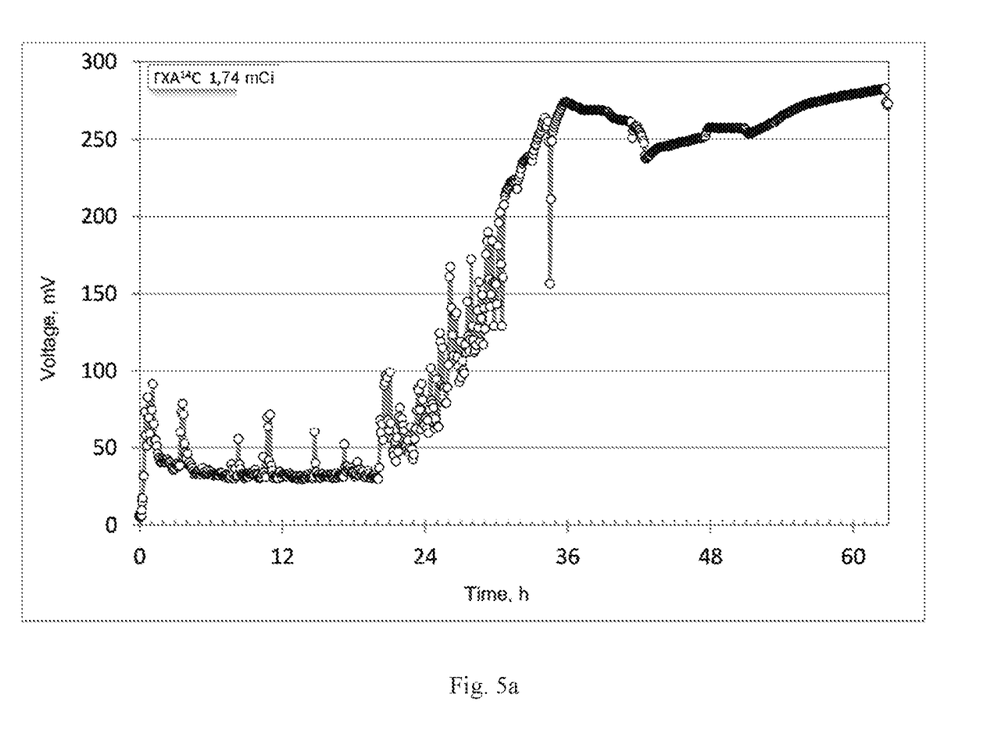
FIG. 5a is a graph depicting dynamics of charging of a cell with an array of CNT on a substrate impregnated with aniline hydrochloride with the C-14 activity equal to 1.74 mCi in a cell filled with distilled water.
Figure 5B:
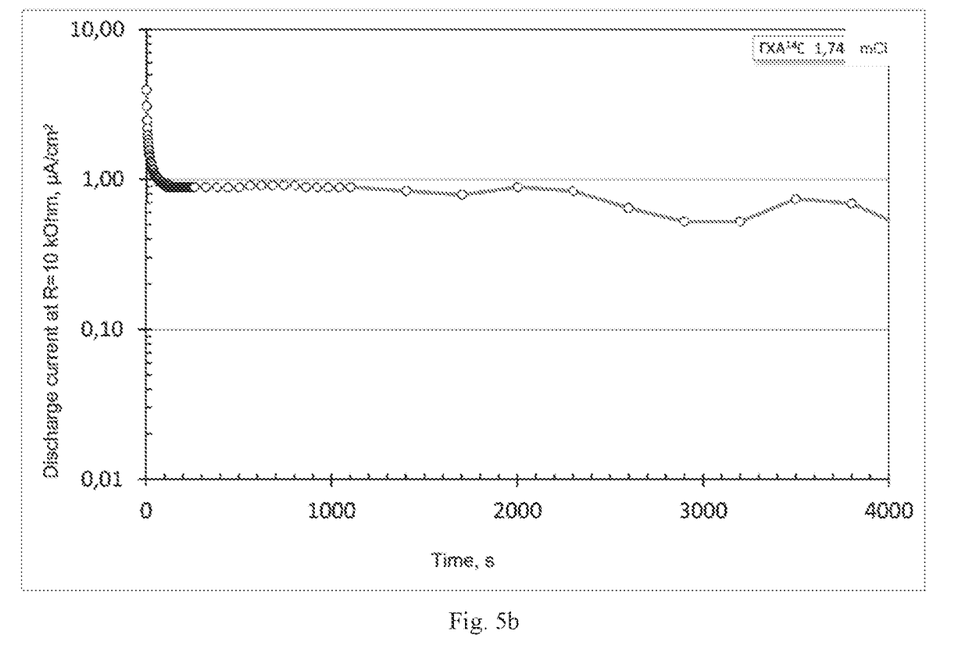
FIG. 5b is a graph depicting dynamics of discharging of a cell with an array of CNT on a substrate impregnated with aniline hydrochloride with the C-14 activity equal to 1.74 mCi in a cell filled with distilled water.

Dynamics of change of the voltage at the cell and the discharge current at the load resistor 10 kOhm are presented in FIG. 5.

In the initial time moment during ~20 hours starting from filling with water, the cell efficiency is low because of a low ion conductivity of clean water. The cell voltage at this stage mostly did not exceed 50 mV. After dissolution of a part of aniline hydrochloride from the substrate in the water with production of the additional ions in it, the voltage at the cell gradually increases during the following 10-12 hours. In the stationary mode, the voltage at the cell stabilizes verging towards the constant value of ~300 mV and maintains at this level unless there is a water in the cell. At this stage, the current of cell loading at the resistor equal to 10 kOhm (FIG. 5b) stabilizes making about 1 mcA/cm$^2$.

The described experiment proves that the efficiency of a cell filled with distilled water as well as of the transformer and accumulator of the electric energy with an array of CNT with the carbon-14 is substantially higher than that of a similar cell with no water.

Example 2

The cell with the substrate prepared as described in Example 1 with an array of CNTs impregnated with aniline hydrochloride with the C-14 activity equal to 6 mCi was dried after performing the experiments with charging and discharging in the cell with distilled water and, then, filled with the electrolyte 0.1 n H$_2$SO$_4$.

Figure 6A:
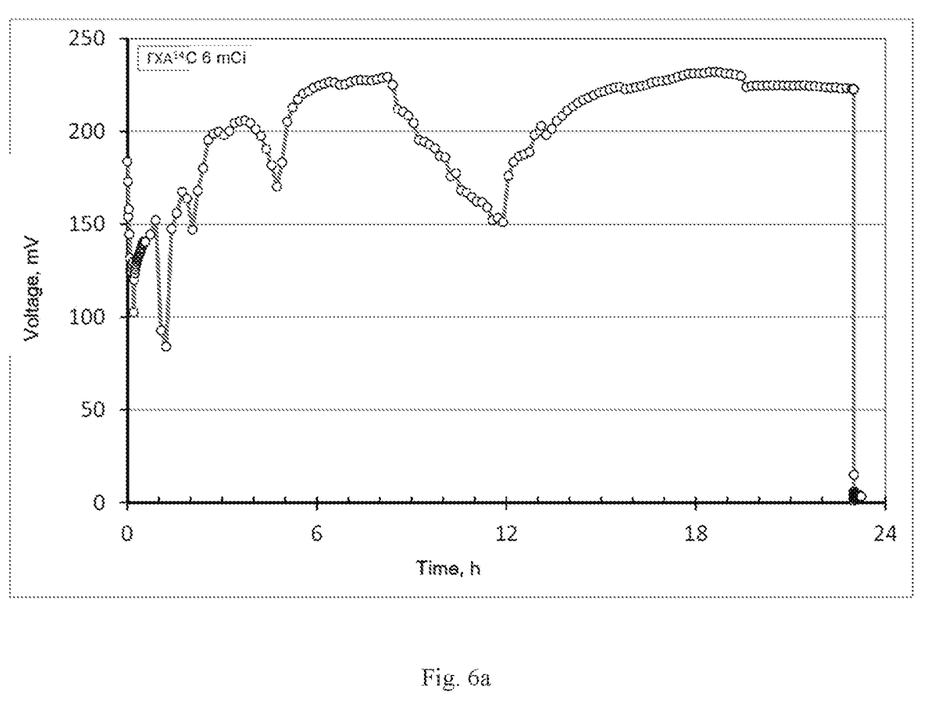
FIGS. 6a and 6b are graphs depicting dynamics of charging of a cell with aniline hydrochloride with the C-14 activity equal to 6 mCi with the electrolyte 0,1 n $H_2SO_4$ (FIG. 6a) and changing of the discharge current in the stationary mode at the load of 10 kOhm (FIG. 6b).
Figure 6B:
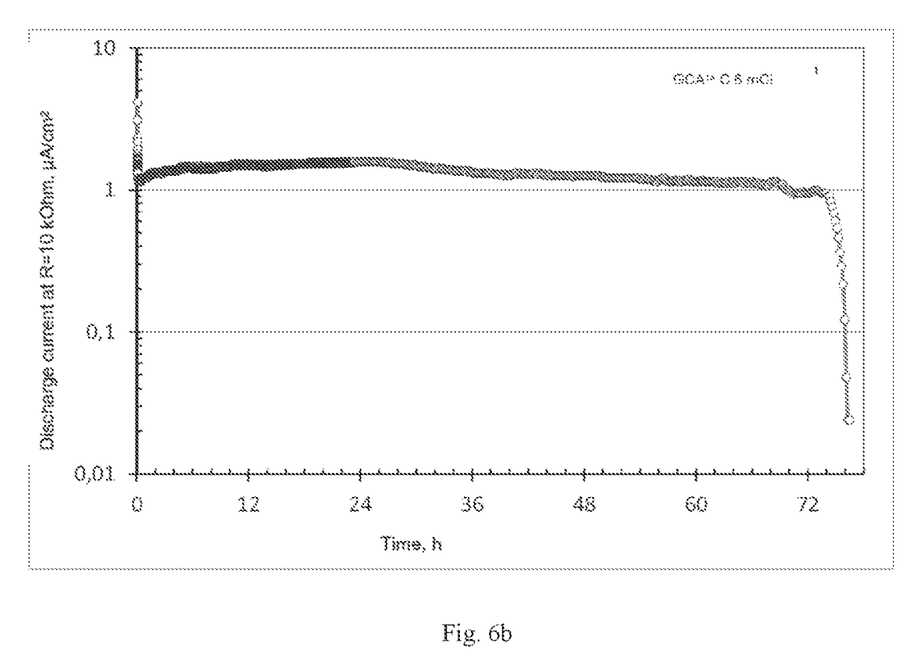

The change of voltage at the cell is characterized by the time diagram presented in FIG. 6a, and the discharge current dynamics in the stationary mode at the load 10 kOhm is presented in FIG. 6b.

In the initial moment, the discharge current in the peak mode reaches 4 mcA/cm$^2$, and after that drops to 1 µA/cm$^2$, and in the intermediate period reaches the maximal value of 1.5 µA/cm$^2$. Additionally, the finish section of the discharge curve is presented in the diagram, when the current drops to zero that is related to evaporation (or radiolysis) of the water from the untight cell.

Figure 7:
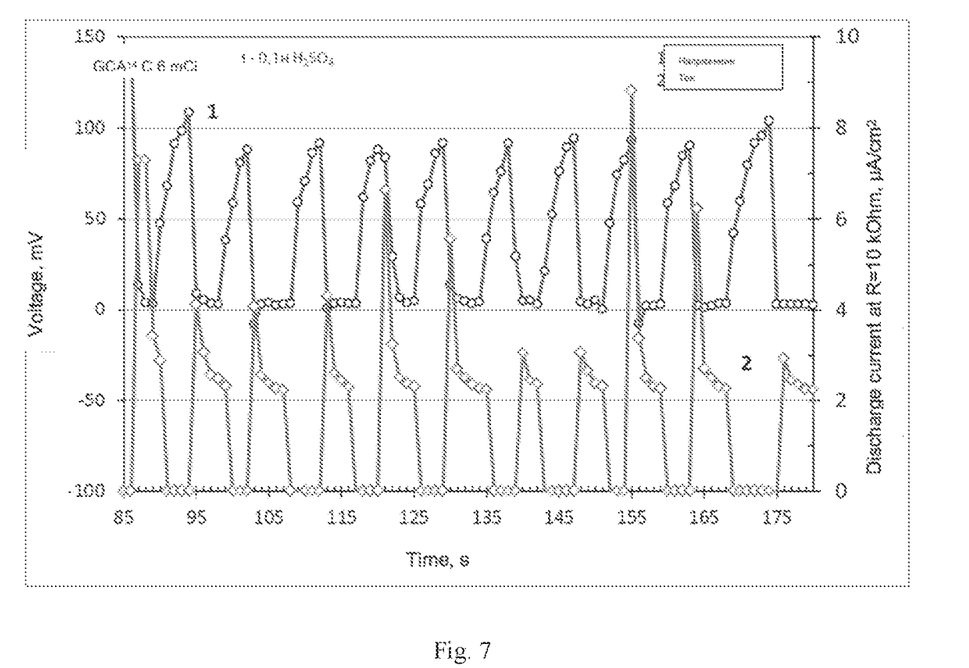
FIG. 7 is a graph depicting changing of the voltage and current at the load in the "charge-discharge" mode at the cell with aniline hydrochloride with the C-14 activity equal to 6 mCi with the electrolyte 0.1 n $H_2SO_4$.

In FIG. 7, the diagram of the cell operation in the "charge-discharge" mode, when using the load resistor of 10 kOhm, is presented.

The diagram shows that in the moment of the load resistor 10 kOhm connection to the cell, the discharge current (curve 2) reaches the maximal value of 4-9 µA/cm$^2$, and then, during several seconds, drops to 2 µA/cm$^2$. When disconnecting the load resistor, the voltage at the cell (curve 1) ramps due to internal charging, in two seconds reaches 50-70 mV, and reaches 90-100 mV at the end of 5-second cycle.

Example 3

The cell with the substrate with the CNT array impregnated with aniline hydrochloride with the C-14 activity equal to 6 mCi after performing the experiments with charging and discharging in the cell with 0.1 n H$_2$SO$_4$ as described in the previous Example 2 was dried and then filled with the electrolyte 0.01 n NaOH.

Figure 8A:
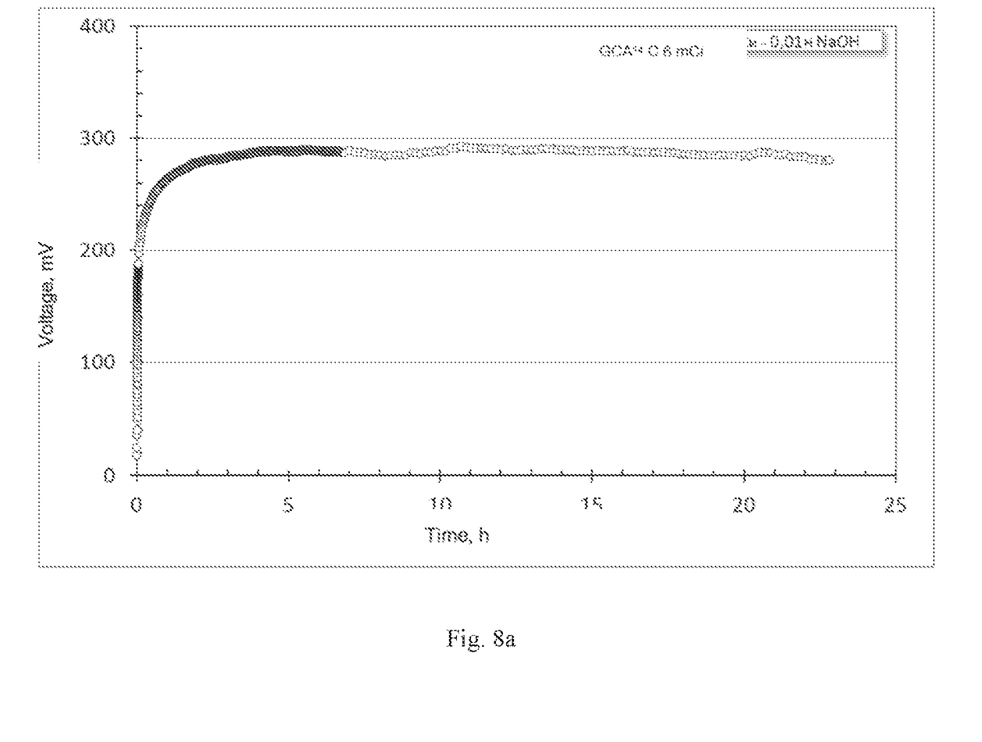
FIGS. 8a and 8b are graphs depicting dynamics of charging of a cell with aniline hydrochloride with the C-14 activity equal to 6 mCi with the electrolyte 0,01 n NaOH (FIG. 8a) and changing of the discharge current in the stationary mode at the load of 10 kOhm (FIG. 8b).
Figure 8B:
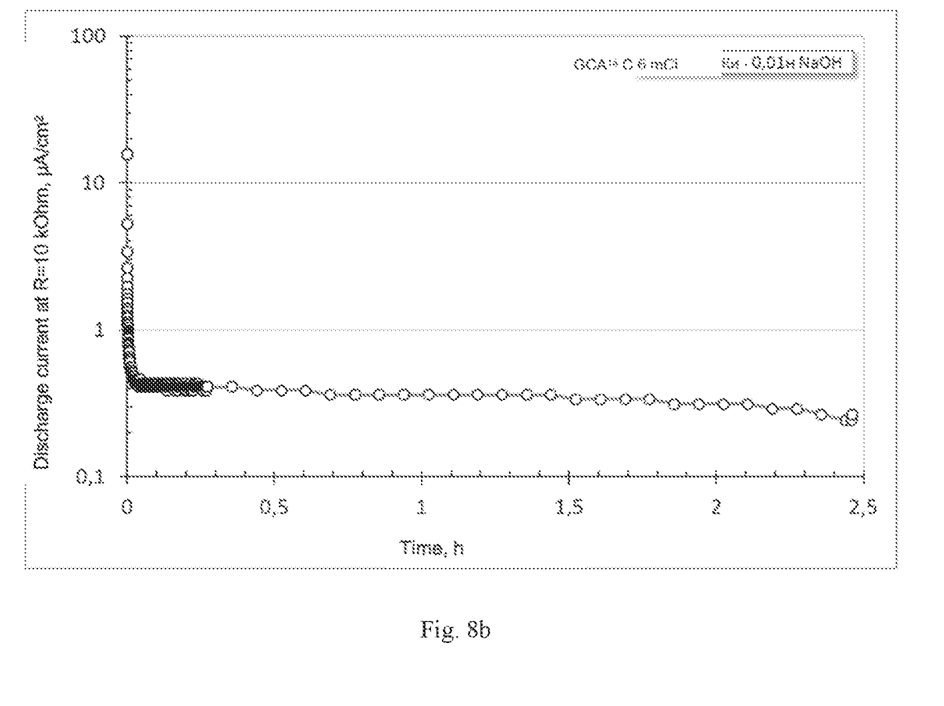

The change of the voltage at the cell is characterized by the time diagram presented in FIG. 8a, and the discharge current dynamics in the stationary mode at the load 10 kOhm is presented in FIG. 8b In the cell with the electrolyte 0.01 n NaOH, similarly to that in the cell with the electrolyte 0.1 n H$_2$SO$_4$, self-charging of the supercapacitor double layer due to the beta-decay energy up to reaching the stationary level of ~300 mV takes place. In the initial time period, the discharge current at the load 10 kOhm increases up to 18 µA/cm$^2$, and then decreases smoothly reaching the stationary value of ~40 µA/cm$^2$.

Thus, in the experiments with the use of the electrolytic cells with the electrodes in the form of the substrates containing the CNT arrays with the C-14 radioisotope, operation of the self-charging supercapacitor has been demonstrated. The device provides multiple charging and discharging without any external current supply.

The above stated data proves that when using the claimed invention the following set of conditions is ensured:

the device in the form of a supercapacitor, embodying the claimed invention when being embodied, provides accumulation and storage of electrical energy without charging from the external sources;

the claimed invention for supercapacitor charging uses beta-decay of the C-14 isotope, the half-life of which makes 5700 years. When the device tightness is ensured, the consumption of the materials of the cell's electrode and housing made of the corrosion-proof alloys is minimal, the electrolyte consumption is zero.

for the claimed device and the method of its construction as described by the independent claims of the presented claims, feasibility of its embodiment using the described in the claim or known before the priority date facilities and methods has been proven.

the device, embodying the claimed invention, is able to ensure the achievement of the technical result anticipated by the applicant.

The invention advantage is as follows:

Increasing of transformation efficiency of the beta-decay energy into the electric energy, that becomes apparent in the increase of the generated current and power as compared with the analogs.

Reducing of production costs of power supply made in the form of a supercapacitor due to application of the C-14 isotope—one of the cheapest (per activity unit) and available at the market isotopes, and due to simplification of the structure and technology of the device production.

The proposed device can be produced using the already available experience in production of the mobile device power supplies, which use the supercapacitors with the electrodes, wherein the electrode coatings with the arrays of carbon nanotubes are applied.

Hence, the claimed invention complies with the requirement to "industrial applicability".

Features of Technical Result Achievement

Feature No. 1 is that in the device, which converts the energy of the radioactive beta-decay into the electrical energy, a supercapacitor is used, operating electrode(s) of which is made in the form of a substrate with a carbon nanotubes array.

Feature No. 2 is that the substrate with an array of carbon nanotubes is impregnated with a chemical compound solution, which includes the C-14 isotope, or the carbon nanotubes are made using the C-14 isotope.

Feature No. 3 is that the substrate with the array of carbon nanotubes is placed into an electrolyte, wherein the double layer formed at the boundary between each nanotube in the array and the electrolyte, being an asymmetrical potential barrier for the generated while decay charges, plays the role of the charges efficient separator and simultaneously the electric energy accumulator.

The invention claimed is:

1. A supercapacitor comprising:
a sealed protective housing;
a first electrode, being an operating electrode, and a second electrode, being an auxiliary electrode, the first and second electrodes placed inside the housing and in electrical isolation from each other, and one or both of the electrodes also being electrically isolated from the housing, and
electrolyte, the electrolyte filling the housing and space between the first and second electrodes;
wherein the first electrode comprises a surface layer of carbonaceous materials on an inner portion of the first electrode, wherein the layer of the carbonaceous materials at the surface of the first electrode is in the form of an any of carbon nanotubes (CNTs), fullerenes, graphene, soot, graphite or any mixture thereof, the layer of carbonaceous materials containing C-12 natural isotope, and the layer of carbonaceous materials being impregnated with a chemical compound comprising the C-14 isotope.

2. The supercapacitor according to claim 1, comprising a separator placed between the electrodes, wherein the separator is configured to prevent mechanical contact of the opposite electrodes and mixing of cathodic and anodic electrolytes.

3. The supercapacitor according to claim 1, wherein the electrodes are made of silicon, molybdenum, niobium, tungsten, or zirconium; or an alloy based on silicon, molybdenum, niobium, tungsten, or zirconium; or a corrosion-resistant steel.

4. The supercapacitor according to claim 1, wherein at least one of the radionuclides selected from the group consisting of H-3, nickel-63, Sr-90, Kg-85, At-241, Ac-227, and Th-229 are placed on the surface or inside of the carbon nanotubes.

5. The supercapacitor according to claim 1, wherein an acid solution, an alkali solution, or a solution of a salt is used to provide the electrolyte.

6. A method of supercapacitor construction, comprising:
preparing a first electrode and a second electrode with application of a surface layer of carbonaceous materials on an inner portion of the first electrode;
placing of the first and second electrodes in a sealed housing and in electrical isolation from each other; and
filling the housing with an electrolyte;
wherein C-14 isotope is introduced into the layer of the carbonaceous materials; and
wherein the layer of carbonaceous materials at the surface of the first electrode is formed as an array of carbon nanotubes (CNTs), fullerenes, graphene, soot, graphite or any mixture thereof, the layer of carbonaceous materials containing C-12 natural isotope, and the layer of carbonaceous materials being impregnated with a chemical compound comprising the C-14 isotope.

7. The method of supercapacitor construction according to claim 6, wherein an alcoholic solution of aniline hydrochloride with the C-14 isotope is used in the capacity of a compound for impregnation of the array of carbonaceous materials at the surface of the first electrode.

* * * * *